(12) United States Patent
Yamaguchi

(10) Patent No.: US 9,394,013 B2
(45) Date of Patent: Jul. 19, 2016

(54) VEHICLE COVER APPARATUS

(71) Applicant: AISIN SEIKI KABUSHIKI KAISHA, Kariya-shi, Aichi-ken (JP)

(72) Inventor: Wataru Yamaguchi, Aichi-ken (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/665,228

(22) Filed: Mar. 23, 2015

(65) Prior Publication Data
US 2015/0266363 A1 Sep. 24, 2015

(30) Foreign Application Priority Data

Mar. 24, 2014 (JP) ................................. 2014-060455

(51) Int. Cl.
*B62D 35/00* (2006.01)
*B62D 37/02* (2006.01)
*B62D 33/02* (2006.01)
*B60J 7/02* (2006.01)

(52) U.S. Cl.
CPC .............. *B62D 35/007* (2013.01); *B60J 7/026* (2013.01); *B62D 33/02* (2013.01); *B62D 37/02* (2013.01)

(58) Field of Classification Search
CPC ......... B60J 7/026; B60R 9/045; B62D 35/00; B62D 35/007; B62D 37/02
USPC ............... 296/100.02, 100.03, 136.03, 180.1, 296/180.2
See application file for complete search history.

(56) References Cited

U.S. PATENT DOCUMENTS

| 4,770,461 | A | * | 9/1988 | Lovaas | ..................... | B60J 7/041 296/100.04 |
|---|---|---|---|---|---|---|
| 5,203,603 | A | * | 4/1993 | Hertzberg | ................ | B60J 7/041 296/100.03 |
| 7,320,494 | B1 | | 1/2008 | Wilson | | |
| 8,783,755 | B2 | * | 7/2014 | Sinkauz | ................... | B60J 7/026 296/100.03 |
| 2008/0088151 | A1 | * | 4/2008 | Shagbazyan | ............. | B60J 7/026 296/100.05 |

FOREIGN PATENT DOCUMENTS

JP 2012-245828 12/2012

* cited by examiner

*Primary Examiner* — Jason S Daniels
(74) *Attorney, Agent, or Firm* — Finnegan, Henderson, Farabow, Garrett & Dunner, LLP

(57) ABSTRACT

A vehicle cover apparatus includes: cover members arranged to be extended over a bed provided on a rear side of a cab and movable in a front-rear direction; and a support unit capable of supporting the respective cover members in an extended state of being arranged to be extended over the bed and in a retracted state of being retracted to a rear side of a roof of the cab. A top surface of the cover members in the retracted state is disposed at the same elevation in a vehicle height direction as a top surface of a rear-end section of the roof which is positioned on the rear roof side of the cab or is disposed lower than the top surface of the rear-end section and, along with the top surface of the roof of the cab, causes a continuous flow path of an air current to be formed.

7 Claims, 10 Drawing Sheets

WITHOUT MOVABLE SPOILER APPARATUS (11)

WITH MOVABLE SPOILER APPARATUS (11)

VEHICLE COVER APPARATUS

CROSS REFERENCE TO RELATED APPLICATIONS

This application is based on and claims priority under 35 U.S.C. §119 to Japanese Patent Application 2014-060455, filed on Mar. 24, 2014, the entire contents of which are incorporated herein by reference.

TECHNICAL FIELD

This disclosure relates to a vehicle cover apparatus.

BACKGROUND DISCUSSION

In the related art, there is a vehicle cover apparatus that includes a plurality of cover members which are unfolded over a bed provided on the rear side of a cab which an occupant enters. For example, U.S. Pat. No. 7,320,494 (Reference 1) discloses a cover apparatus (tonneau cover hardware) that includes a plurality of cover members which are connected to each other in a foldable way using a hinge. The respective cover members are unfolded over a bed and cover an opening thereof and thereby, a sight-screening effect and waterproof/windproof effects are achieved.

In addition, employment of the cover apparatus makes it possible to expect improvement in aerodynamic characteristics. That is, covering the opening of the bed makes it possible to suppress turbulence from occurring. Then, it is possible to improve travelling performance of the vehicle.

However, in the cover apparatus of the related art, when the bed is used, the respective cover members folded with the hinge positioned on the upper side are uprightly latched to a rear-end section of the cab and are assembled and arranged at a front-end section of the bed. In the case of the assembled state, since there is a concern that the respective folded cover members result in deterioration of the aerodynamic characteristics, there is room for improvement.

SUMMARY

Thus, a need exists for a vehicle cover apparatus which is not susceptable to the drawback mentioned above.

It is preferable that a vehicle cover apparatus according to an aspect of this disclosure includes: a plurality of cover members that are arranged to be extended over a bed provided on a rear side of a cab; and a support unit that is able to support the respective cover members in an extended state of being arranged to be extended over the bed and in a retracted state of being retracted to a rear side of a roof of the cab, in which a top surface of the cover members in the retracted state is disposed at the same elevation in a vehicle height direction as a top surface of a roof rear-end section which is positioned on the rear side of the roof of the cab or be disposed lower than the top surface of the roof rear-end section.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
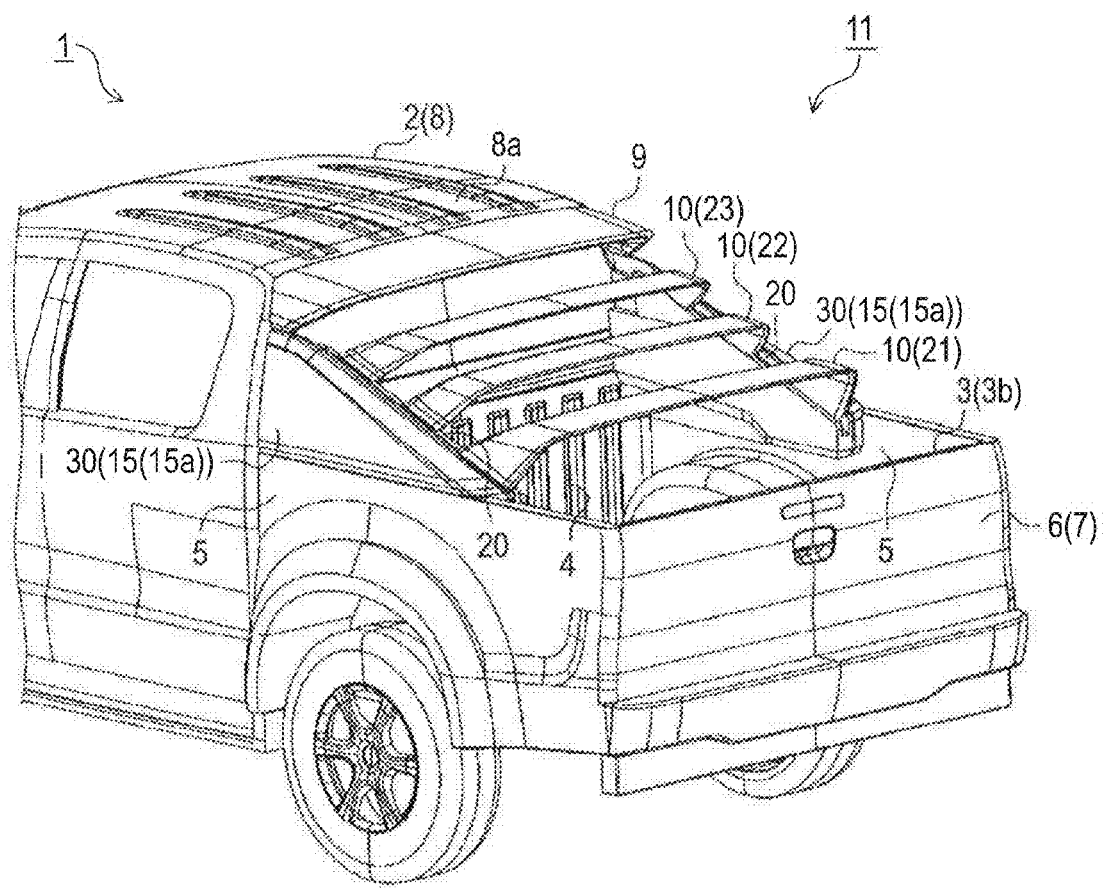
FIG. 1 is a perspective view (extended state) of a movable spoiler apparatus.
Figure 2:
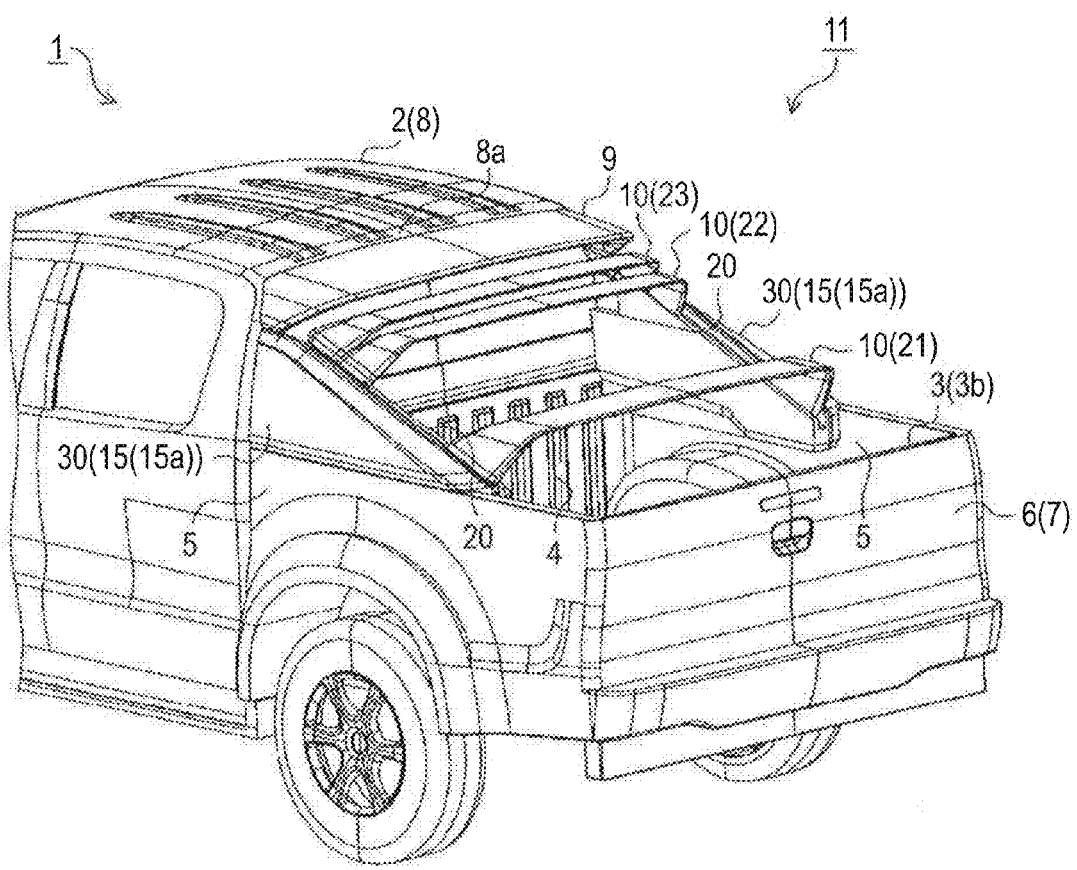
FIG. 2 is a perspective view (transition state: before separation) of the movable spoiler apparatus.
Figure 3:
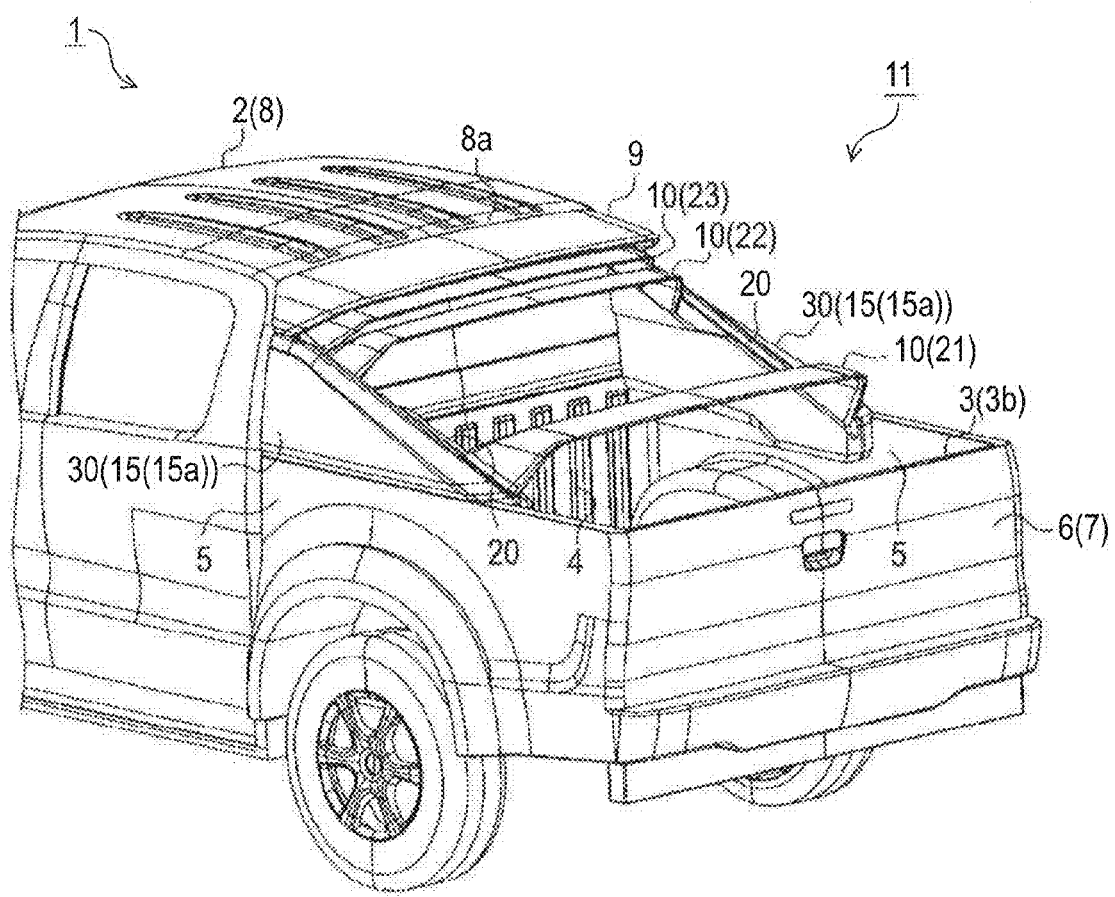
FIG. 3 is a perspective view (transition state: after separation) of the movable spoiler apparatus.
Figure 4:
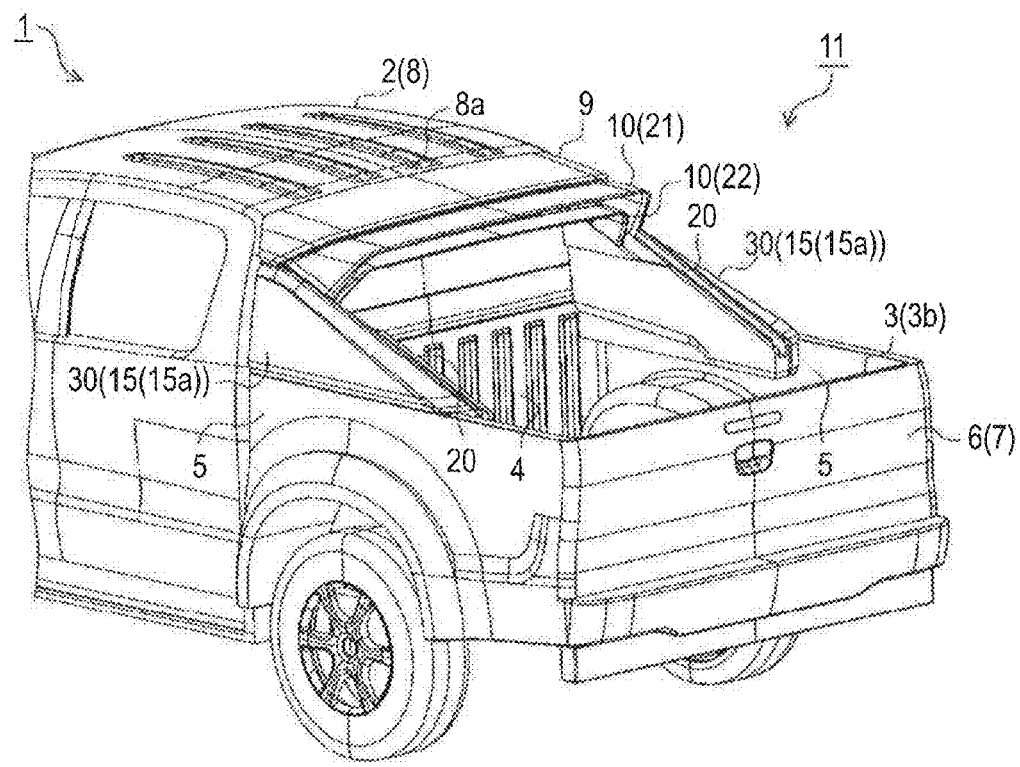
FIG. 4 is a perspective view (retracted state) of the movable spoiler apparatus.

Hereinafter, an embodiment in which a vehicle cover apparatus is embodied as a movable spoiler apparatus is described with reference to the drawings.

As illustrated in FIG. 1 to FIG. 8, a vehicle 1 of the embodiment includes a bed 3 provided on the rear side (right side in FIG. 5 to FIG. 8) of a cab 2 which an occupant enters. Specifically, the bed 3 has a known structure in which four sides thereof are surrounded by a rear wall 4 of the cab 2, a pair of side wall sections 5 which extend toward the rear side of the vehicle 1 from opposite ends of the rear wall 4 in a width direction, and a rear-side wall section 6 that is connected to the rear ends of both of the side wall sections 5. An openable/closable stowing section 7 is formed in the rear-side wall section 6 positioned on a rear-end section 3b of the bed 3.

In addition, the vehicle 1 of the embodiment includes a fixed spoiler 9 (fixed member) provided in the roof rear-end section 8a such that the top surface thereof is continuous or substantially flush with a roof 8 of the cab 2. That is, the top surface of the fixed spoiler 9 is disposed lower than the top surface of the roof rear-end section 8a and, along with the top surface of the roof 8, causes a continuous flow path of an air current to be formed. The vehicle 1 is provided with the movable spoiler apparatus 11 that includes a plurality of movable spoilers 10 arranged to be extended over the bed 3.

To be more specific, the movable spoiler apparatus 11 of the embodiment includes a pair of support members 15 which are fixed to the side wall sections 5, respectively, and thereby, are able to support the movable spoilers 10 over the bed 3. Specifically, the support members 15 form, on the side wall sections 5 to which the corresponding support members 15 are fixed, substantially right-triangle-shaped support sections 15a, respectively, such that two orthogonal sides of the support section 15a are in contact with the rear wall 4 of the cab 2 and an upper end of the side wall section 5. Then, the respective movable spoilers 10 are supported by both of the support sections 15a in a state of being across inclined sides of the support sections 15a.

Figure 8:
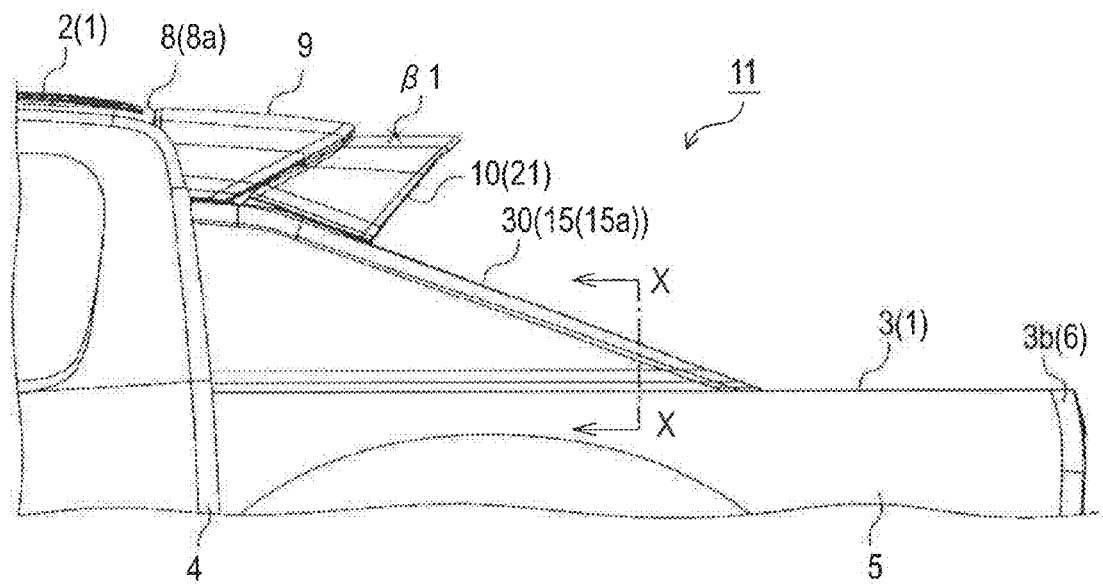
FIG. 8 is a side view (retracted state) of the movable spoiler apparatus.
Figure 9:
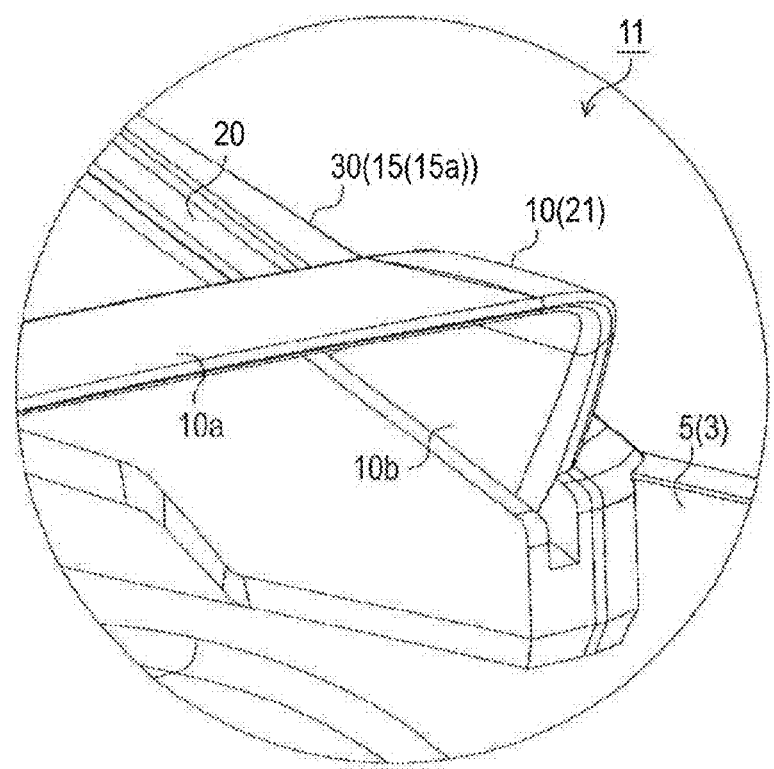
FIG. 9 is an enlarged view of a guide path formed in a movable spoiler and a support member.
Figure 10:
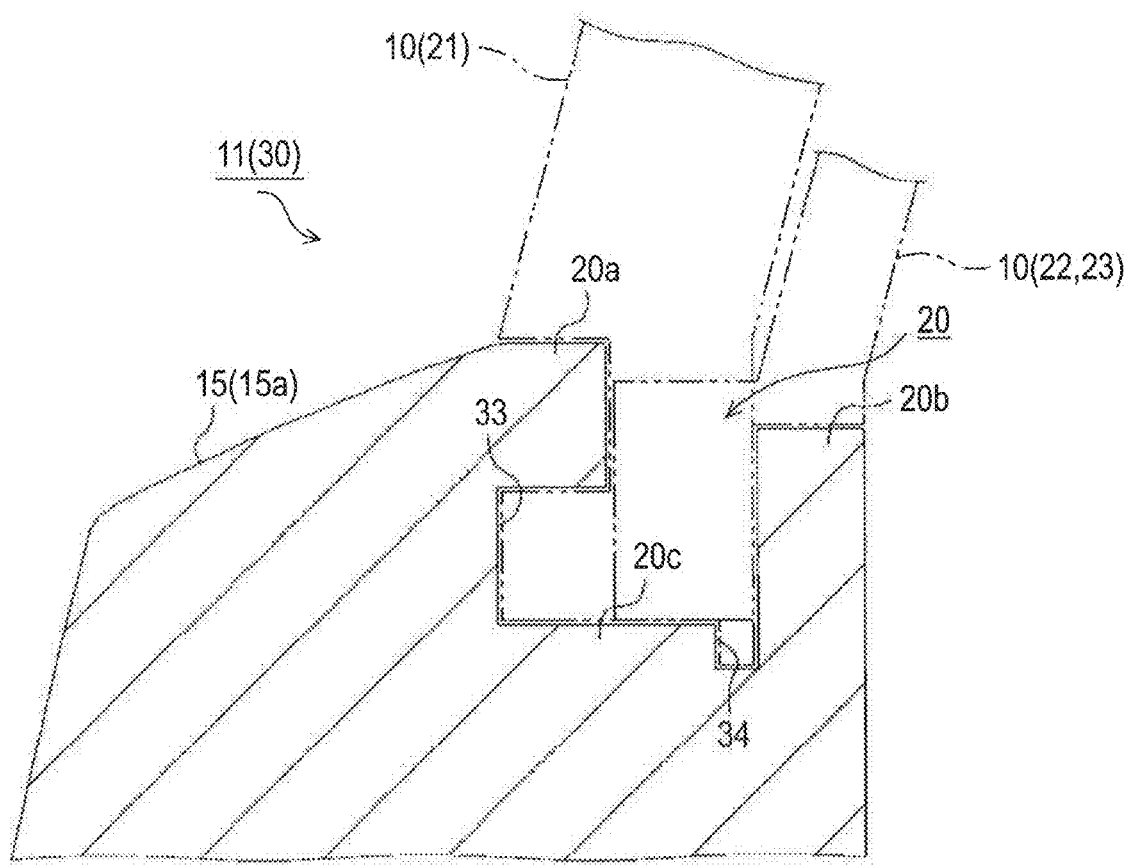
FIG. 10 is a cross-sectional view (cross-sectional view taken along line X-X in FIG. 8) of the guide path formed in the support member.

As illustrated in FIG. 9 and FIG. 10, groove-like guide paths (guide rails) 20 which extend in an extension direction of the support section 15a are formed in the inclined side of both of the support sections 15a. In addition, each of the respective movable spoilers 10 includes a main body section 10a that has a substantially flat plate-like external appearance and extends in a vehicle width direction (direction orthogonal to a paper surface in each drawing with reference to FIG. 5 to FIG. 8) and leg sections 10b provided at opposite ends of the main body section 10a in a longitudinal direction. The leg sections 10b of the movable spoilers 10 are supported by the support members 15, respectively, in a state of engaging with the guide paths 20 and thereby the movable spoilers 10 can move (slide) along the guide paths 20 in the vehicle front-rear direction.

As illustrated in FIG. 1 to FIG. 8, the movable spoiler apparatus 11 of the embodiment includes three movable spoilers 10 (21 to 23) supported by both of the support members 15. In addition the movable spoiler apparatus 11 includes a rotary handle type drive input section (not illustrated). Further, a drive force input by the rotary handle is transmitted to the movable spoiler 10 through a known drive belt (not illustrated). That is, in the movable spoiler apparatus 11 of the embodiment, the movable spoilers 10 move by manual operation on the support members 15 in the vehicle front-rear direction, respectively. According to the embodiment, in this manner, a support unit 30 is formed and is able to support the respective movable spoilers 10 in an extended state of being arranged to be extended on the upper side of the bed 3 and in a retracted state of being retracted together.

Figure 5:
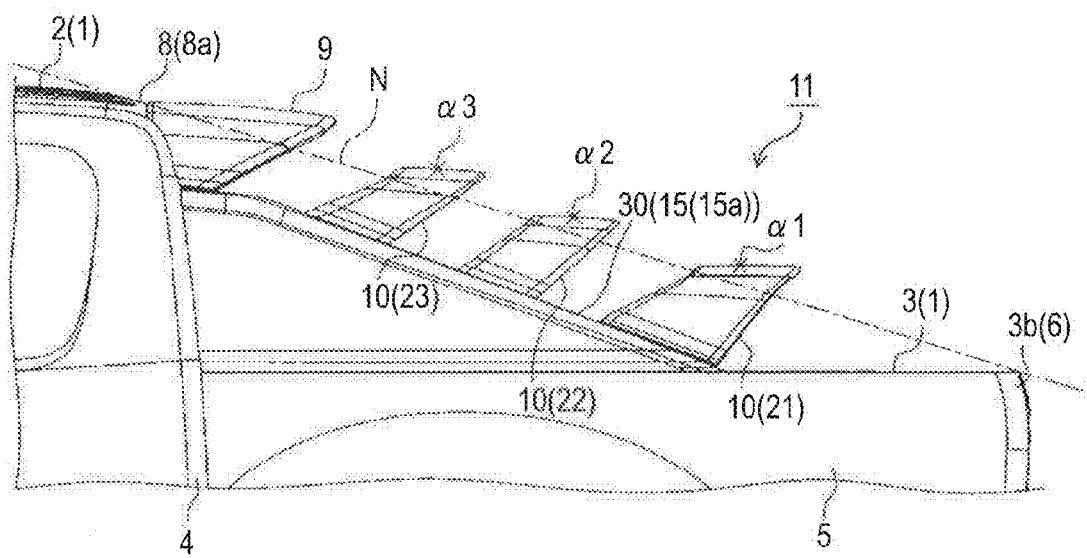
FIG. 5 is a side view (extended state) of the movable spoiler apparatus.
Figure 6:
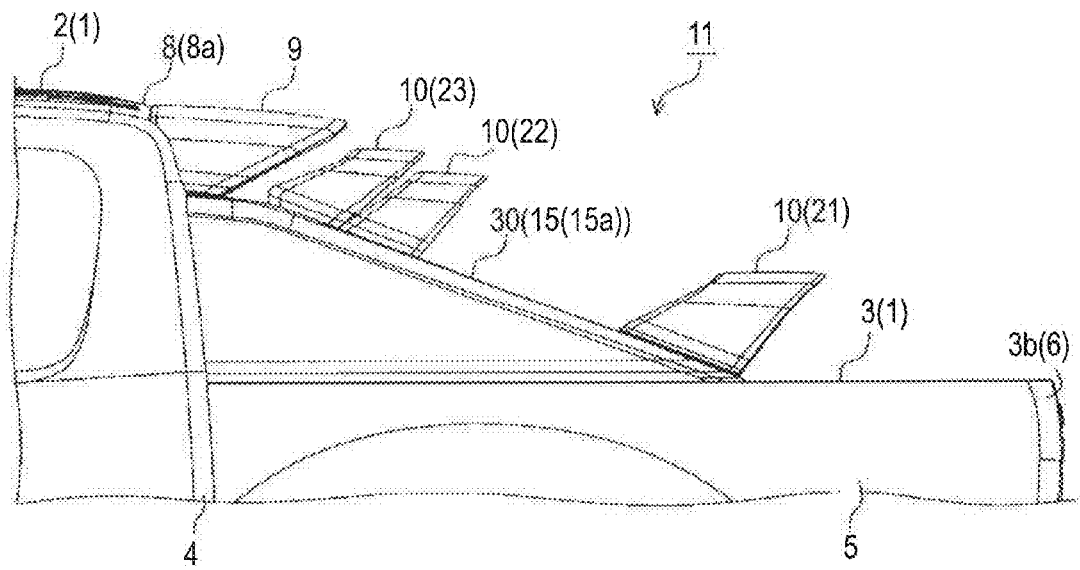
FIG. 6 is a side view (transition state: before separation) of the movable spoiler apparatus.
Figure 7:
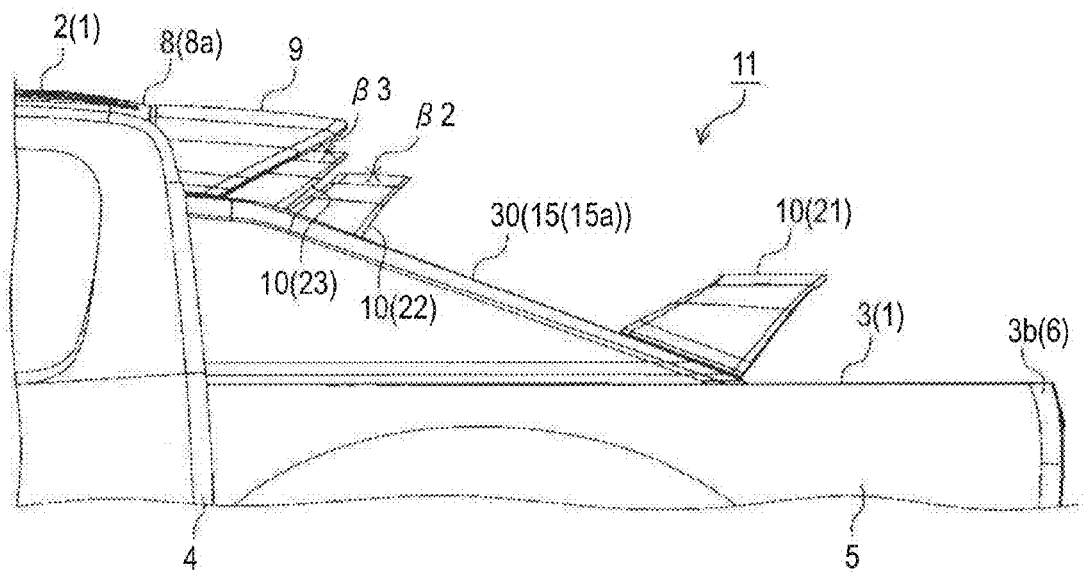
FIG. 7 is a side view (transition state: after separation) of the movable spoiler apparatus.

To be more specific, as illustrated in FIG. 1 and FIG. 5, in the movable spoiler apparatus 11 of the embodiment, the respective movable spoilers 10 (21 to 23) are arranged to be extended in an uneven state (at extended positions α1 to α3) so as to be arranged along a straight line N connecting the roof rear-end section 8a of the cab 2 and the rear-end section 3b (upper end of the rear-side wall section 6) of the bed 3. Specifically, the respective movable spoilers 10 are arranged to be extended in the vehicle front-rear direction at a substantially equal interval with the fixed spoiler 9 provided in the roof rear-end section 8a as a starting point. In the extended state, each of the movable spoilers 10 is configured such that the main body section 10a extending in the vehicle width direction is substantially horizontally disposed. Further, the respective movable spoilers 10 are disposed lower than a movable spoiler (for example, for the movable spoiler 22, corresponding to the movable spoiler 21 disposed in front) disposed in front of the respective movable spoilers 10.

In addition, as illustrated in FIG. 2 to FIG. 4 and FIG. 6 to FIG. 8, in the movable spoiler apparatus 11 of the embodiment, the respective movable spoilers 10 (21 to 23) are retracted to the rear side of the roof of the cab 2. In the retracted state, the first movable spoiler 21 which is disposed to be extended closest to the rear-end section 3b of the bed 3 in the extended state (refer to FIG. 1 and FIG. 5) is disposed immediately after the fixed spoiler 9. The second movable spoiler 22 and the third movable spoiler 23 arranged to be extended closer to the front side than the first movable spoiler 21 are retracted to be arranged beneath the first movable spoiler 21.

Specifically, the first movable spoiler 21 is disposed such that the top surface thereof (top surface of the main body section 10a) is continuous with the fixed spoiler 9. To be more specific, the first movable spoiler 21 is disposed slightly lower than in a flush state (refer to FIG. 8). That is, the top surface (top surface of the main body section 10a) of the first movable spoiler 21 is disposed lower than the top surface of the roof rear-end section 8a of the roof 8 of the cab 2 and the first movable spoiler 21 comes closer to the fixed spoiler 9. As illustrated in FIG. 8, in the retracted state, the top surface of the first movable spoiler 21 along with the top surface of the roof 8 and the top surface of the fixed spoiler 9 causes a continuous flow path of an air current to be formed. The first movable spoiler 21 may come into contact with the fixed spoiler 9. In addition, the second movable spoiler 22 and the third movable spoiler 23 have external appearances smaller than that of the first movable spoiler 21. The second movable spoiler 22 and the third movable spoiler 23 are arranged beneath the first movable spoiler 21 in a state in which the upper sides thereof are covered. The top surfaces of the second movable spoiler 22 and the third movable spoiler 23 are arranged lower than the top surface of the roof rear-end section 8a.

That is, according to the embodiment, the first movable spoiler 21 configures a first cover member and the second movable spoiler 22 and the third movable spoiler 23 configure the second cover members. In this manner, the movable spoiler apparatus 11 of the embodiment is configured such that the first movable spoiler 21 continually functions as the spoiler (rectification member) even in the retracted state.

To be more specific, as illustrated in FIG. 1 to FIG. 8, according to the embodiment, when transition from the extended state to the retracted state is performed, first, the second movable spoiler 22 and the third movable spoiler 23 move from the extended positions α2 and α3 to the retracted positions β2 and β3. Then, the first movable spoiler 21 moves from the extended position α1 to the retracted position β1 so as to cover the upper side of the second movable spoiler 22 and the third movable spoiler 23.

Figure 11:
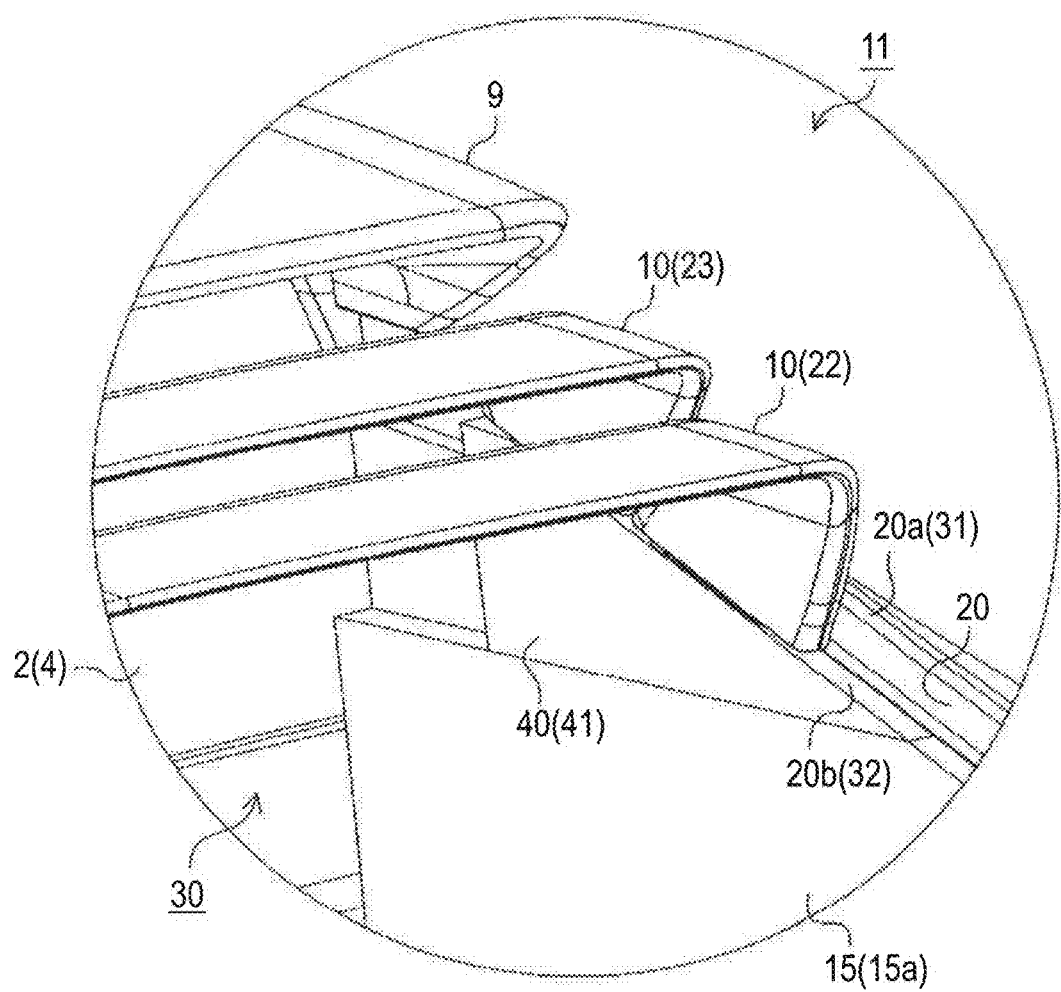
FIG. 11 is an enlarged view (before separation) of the vicinity of a movable wall.
Figure 12:
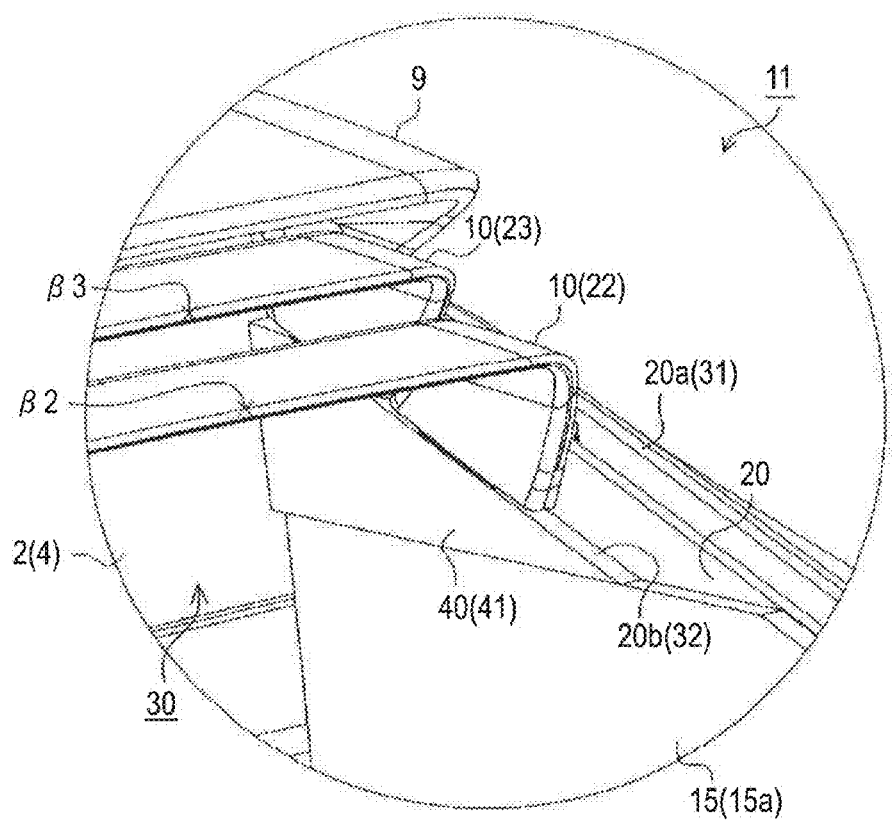
FIG. 12 is an enlarged view (after separation) of the vicinity of a movable wall.

Here, as illustrated in FIG. 11 and FIG. 12, the support units 30 (respective support members 15) of the embodiment includes a first guide path 31 extending toward the first retracted position β1 set on the rear side of the fixed spoiler 9 and a second guide path 32 that diverges from the first guide path 31.

That is, the first movable spoiler 21 moves along the first guide path 31 and thereby is disposed on the rear side of the roof rear-end section 8a, that is, at the first retracted position β1 that is set to be disposed immediately after the fixed spoiler 9. Further, the second movable spoiler 22 and the third movable spoiler 23 also move along the first guide path 31 from the extended positions α2 and α3, respectively. The support unit 30 of the embodiment includes a second transport unit 40 that separates the second movable spoiler 22 and the third movable spoiler 23 moving along the first guide path 31 therefrom to the second guide path 32 and causes the movable spoilers to be disposed at the second retracted positions β2 and β3.

As illustrated in FIG. 10, according to the embodiment, the guide path 20 formed in each of the support members 15 as described above is configured to have the first and second guide paths 31 and 32. The guide path 20 (31 and 32) of the embodiment is formed to be groove-like such that first and second side walls 20a and 20b face each other in the vehicle width direction (horizontal direction in FIG. 10). According to the embodiment, engagement grooves 33 and 34 extending in the extension direction are formed in the first side wall 20a positioned on the outer side in the vehicle width direction and in a bottom section 20c of the guide path 20, respectively. In a state in which the first movable spoiler 21 engages with the first side wall 20a and the second movable spoiler 22 and the third movable spoiler 23 engage with the second side wall 20b (side wall on the right side in FIG. 10) positioned on the inner side in the vehicle width direction, it is possible for the movable spoilers to slide along the guide path 20.

In addition, as illustrated in FIG. 11 and FIG. 12, the second side wall 20b of the guide path 20 functions as the movable wall 41 of which an end portion on the vehicle front side slides in the vehicle front-rear direction. Specifically, the movable wall 41 is configured to move toward the vehicle front side substantially at a level by being pressed by the second movable spoiler 22 and the third movable spoiler 23 moving to the vehicle front side. The support unit 30 of the embodiment is configured such that the movable wall 41 functions as a separation mechanism 40.

That is, the second movable spoiler 22 and the third movable spoiler 23 which engage with the second side wall 20b move toward the vehicle front side integrally with the movable wall 41 by sliding of the movable wall 41 which configures the second side wall 20b, to the vehicle front side. That is, according to the embodiment, the second side wall 20b having the movable wall 41 forms the second guide path 32. In this manner, the second movable spoiler 22 and the third movable spoiler 23 are arranged at the second retracted positions $\beta 2$ and $\beta 3$ which are set lower than the first retracted position $\beta 1$.

The first movable spoiler 21 which engages with the first side wall 20a moves to the first retracted position $\beta 1$ regardless of the movement of the movable wall 41. According to the embodiment, in this manner, the first movable spoiler 21 extended to be arranged on the rear side of the second movable spoiler 22 and the third movable spoiler 23 in the extended state is configured to be retracted and to cover the upper side of the second movable spoilers without interfering with the second movable spoiler 22 and the third movable spoiler 23.

Next, operations of the movable spoiler apparatus 11 configured as above, according to the embodiment, will be described.

Figure 13:
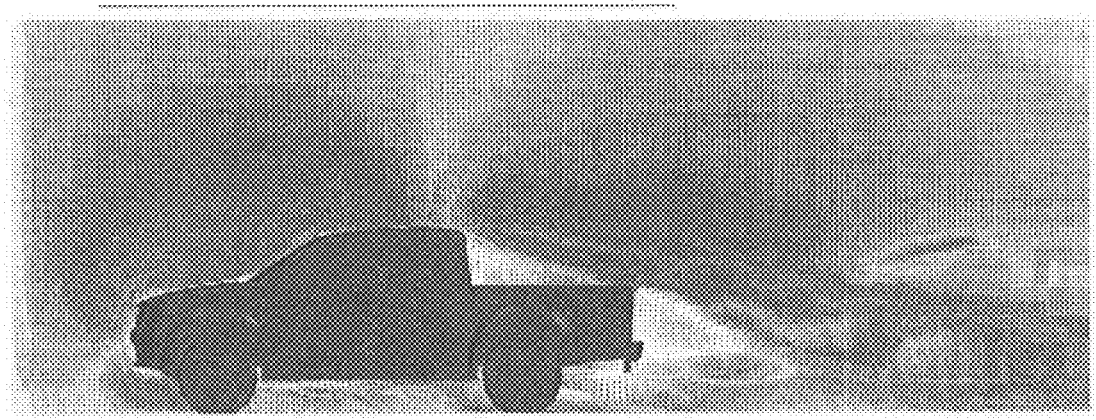
FIG. 13 is a view showing aerodynamic characteristics of a vehicle (vehicle without the movable spoiler apparatus)

That is, as illustrated in FIG. 13, in the vehicle 1 in which the bed 3 is provided on the rear side of the cab 2, the bed 3 open at the upper side causes turbulence to be produced during driving. In this manner, aerodynamic characteristics deteriorate, and thus, for example, there is a concern that travelling performance deteriorates, such as high fuel consumption and an occurrence of wind noise.

Figure 14:
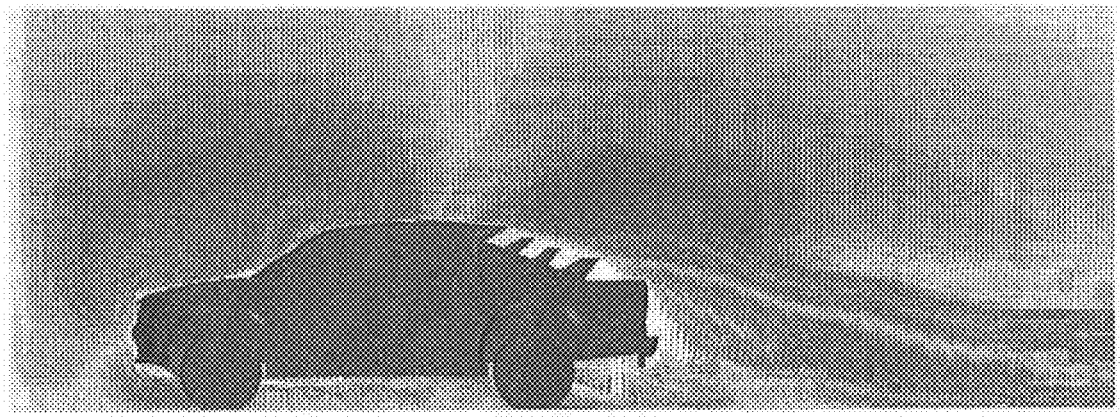
FIG. 14 is a view showing aerodynamic characteristics of a vehicle (vehicle with the movable spoiler apparatus).

However, as illustrated in FIG. 14, even in such a vehicle 1, the movable spoiler apparatus 11 is mounted and then, it is possible to suppress the turbulence from being produced. In this manner, the aerodynamic characteristics are improved and thus, it is possible to achieve improvement of the travelling performance.

Hereinafter, according to the embodiment, it is possible to achieve the following effects.

(1) The movable spoiler apparatus 11 includes the plurality of movable spoilers 10 (21 to 23) that are arranged to be extended over the bed 3 and the support unit 30 that is able to support the respective movable spoilers 10 in the extended state and in the retracted state of being retracted to the rear side of the roof of the cab 2. The top surface (top surface of the main body section 10a) of the first movable spoiler 21 is disposed lower than the top surface of the rear-end section 8a of the roof 8 of the cab 2 and thereby the first movable spoiler 21 functions as the spoiler. The support unit 30 is configured such that the first movable spoiler 21 also functions as the spoiler in the retracted state.

That is, the extended arrangement of the respective movable spoilers 10 above the bed 3 makes it possible to achieve an enhanced rectification effect. In this manner, turbulence is suppressed from occurring and thus, it is possible to improve the aerodynamic characteristics of the vehicle 1.

In addition, the respective movable spoilers 10 function as a cover member that covers an opening of the bed 3 and then, a sight-screening effect and waterproof/windproof effects are achieved. Even in the retracted state of the respective movable spoilers 10, the first movable spoiler 21 continually functions as the spoiler and thereby, it is possible to improve the aerodynamic characteristics of the vehicle 1 in a loadable state of cargo.

(2) The respective movable spoilers 10 are arranged to be extended in the uneven states so as to be disposed along the straight line N connecting the rear-end section 8a of the roof of the cab 2 and the rear-end section 3b of the bed 3. In such a configuration, an air current flows to the rear side without flowing away from the respective movable spoilers 10. In this manner, it is possible to achieve an enhanced rectification effect.

(3) The support unit 30 causes the respective movable spoilers 10 to slide along the guide path 20 extending to the front side from the rear side of the bed 3, toward the retracted positions ($\beta 1$ to $\beta 3$) set on the rear side of the roof of the cab 2 and thereby is able to switch between the extended state and the retracted state. The employment of such a configuration makes it possible to easily switch between the extended state and the retracted state.

(4) The movable spoiler apparatus 11 includes the first movable spoiler 21 as the first cover member that continually functions as the spoiler by being disposed at the first retracted position $\beta 1$ and the second movable spoiler 22 and the third movable spoiler 23 as second cover members which are disposed at the second retracted positions $\beta 2$ and $\beta 3$ and thereby the upper side thereof is covered by the first movable spoiler 21. In this manner, it is possible to more compactly arrange the respective movable spoilers 10 (21 to 23) in a retracted arrangement.

(5) The first movable spoiler 21 is arranged to be extended to the rear side from the second movable spoiler 22 and the third movable spoiler 23. That is, the rectification effect by the movable spoiler apparatus 11 greatly depends on aerodynamic characteristics of the first movable spoiler 21 which is disposed at the position closest to the rear-end section 3b of the bed 3. Then, the first movable spoiler 21 continually functions as the spoiler in the retracted state and thus, it is possible to achieve a more enhanced rectification effect.

(6) The support unit 30 includes the first guide path 31 that extends toward the first retracted position $\beta 1$ and the second guide path 32 that diverges from the first guide path 31. The support unit 30 further includes the separation mechanism 40 that separates the second movable spoiler 22 and the third movable spoiler 23 which move along the first guide path 31 therefrom to the second guide path 32 and causes the second and third movable spoilers to be disposed at the second retracted positions $\beta 2$ and $\beta 3$.

According to the configuration described above, it is possible to cause the first movable spoiler 21 to move to the first retracted position $\beta 1$ at which the upper side of the second movable spoiler 22 and the third movable spoiler 23 is covered without interfering with the movable spoilers in a simple configuration. In this manner, a stable movement of the movable spoiler apparatus 11 is secured and it is possible to simplify the configuration of the support unit 30.

(7) The guide path 20 (31 and 32) includes the pair of side walls 20a and 20b which face each other in the vehicle width direction. In addition, the first movable spoiler 21 engages with the first side wall 20a on the outer side in the vehicle width direction and the second movable spoiler 22 and the third movable spoiler 23 slide along the guide path 20 in the state of engaging with the second side wall 20b on the inner side in the vehicle width direction. The end section of the second side wall 20b on the vehicle front side is pressed by the second movable spoiler 22 and the third movable spoiler 23 and thereby, the second side wall 20b functions as the movable wall 41 that moves toward the vehicle front side substantially at a level.

That is, the second movable spoiler 22 and the third movable spoiler 23 which engage with the second side wall 20b move toward the vehicle front side integrally with the movable wall 41 and the first movable spoiler 21 which engages with the first side wall 20a moves to the first retracted position β1 regardless of the movement of the movable wall 41. According to the configuration described above, it is possible to form the separation mechanism 40 which can stably move in a simple configuration. In this manner it is possible to simplify the configuration of the support unit 30.

The embodiment described above may be modified as follows.

According to the embodiment described above, the vehicle cover apparatus is embodied as the movable spoiler apparatus. However, the disclosure is not limited thereto and may be applied to an apparatus which has the configuration including a plurality of cover members extended over a bed and in which, similar to a tonneau cover hardware (for example, see Reference 1), each of the cover members in the extended state does not function as the spoiler as a single body.

In addition, the number of the cover members may not be limited. The switching operation between the extended state and the retracted state may not necessarily be the sliding method. For example, a folding method using a hinge, a method in which the support position is changed by attachment and detachment, or the like may be employed.

According to the embodiment described above, the respective movable spoilers 10 are arranged to be extended at the substantially equal interval in the vehicle front-rear direction with the fixed spoiler 9 provided in the roof rear-end section 8a as the starting point. The retracted positions (β1 to β3) are set to be disposed immediately after the fixed spoiler 9. However, the configuration is not limited thereto, and the fixed spoiler 9 may not necessarily be provided. In this case, in the retracted state of the movable spoilers 10, the top surface of the first movable spoiler 21 comes close to or into contact with the roof rear-end section 8a of the roof 8, and is disposed to be the same in elevation as the top surface of the roof rear-end section 8a in the vertical direction or is disposed lower than the top surface of the roof rear-end section 8a, and, along with the top surface of the roof 8, causes a continuous flow path of an air current to be formed. Further, instead of the first movable spoiler 21, the top surfaces of the second movable spoiler 22 or the third movable spoiler 23 may come close to or into contact with the roof rear-end section 8a, and may be disposed to be the same in elevation as the top surface of the roof rear-end section 8a in the vertical direction or may be disposed lower than the top surface of the roof rear-end section 8a, and, along with the top surface of the roof 8, may cause a continuous flow path of an air current to be formed.

In addition, the fixed spoiler 9 is fixed to the roof rear-end section 8a; however, the fixed spoiler may be movable in the same way as the respective movable spoilers 10.

In addition, the extended positions (α1 to α3) of the respective movable spoilers 10 may be arbitrarily changed. For example, the movable spoilers may not necessarily be extended to be arranged at the equal interval. In addition, the movable spoilers may not be extended to be arranged in the uneven state.

Further, the retracted positions (β1 to β3) of the respective movable spoilers 10 may be arbitrarily changed. For example, the movable spoiler 10 disposed at the first retracted position β1 at which it is possible to continually function as the spoiler in the retracted state may not necessarily be the first movable spoiler 21 disposed at the position closest to the rear-end section 3b of the bed 3. That is, a configuration may be employed, in which the movable spoiler 10 arranged to be extended to the rear side is retracted to be disposed beneath the movable spoiler 10 arranged to be extended to the front side. A configuration may be employed in which the plurality of movable spoilers 10 continually functions as the spoiler in the retracted state.

In addition, the characteristics of the rectification effect may be changed in the retracted state. For example, a configuration may be employed, in which the movable spoiler 10 at a retracted position farther on the rear side is retracted to be arranged on the upper side and thus downforce is obtained.

According to the embodiment described above, the support unit 30 causes the respective movable spoilers 10 to move manually but the support unit may have a drive source.

In addition, the support unit 30 includes the first guide path 31 extending toward the first retracted position β1 and the second guide path 32 which diverges from the first guide path 31; however, the support unit may have a plurality of separate guide paths 20. The configuration of the separation mechanism 40 may be arbitrarily changed.

In addition, the first movable spoiler 21 is disposed to be slightly lower than the top surface (top surface of the roof rear-end section 8a) of the roof 8. However, the configuration is not limited thereto and the first movable spoiler 21 (including the second movable spoiler 22 and the third movable spoiler 23) may be in the state of being flush with the top surface of the roof rear-end section 8a. In addition, the top surface of the first movable spoiler 21 (including the second movable spoiler 22 and the third movable spoiler 23) may be disposed to be the same in elevation as the top surface of the roof rear-end section 8a in the vertical direction.

Next, technical ideas which can be understood from the embodiment described above will be described with effects.

(A) In the vehicle cover apparatus, the guide path includes the first and second side walls, the first cover member engages with the first side wall, the second cover member engages with the second side wall, and a movable wall that slides to the vehicle front side when being pressed by the second cover member is formed in the second side wall.

That is, the second cover member which engages with the second side wall moves toward the vehicle front side integrally with the movable wall and the first cover member moves to the first retracted position regardless of the movement of the movable wall. According to the configuration described above, it is possible to form the separation mechanism which is stably movable in a simple configuration. In this manner, it is possible to simplify the configuration of the support unit.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle cover apparatus comprising:
a plurality of cover members that are arranged to be extended over a bed provided on a rear side of a cab and that are movable in a front-rear direction; and
a support unit that is able to support the respective cover members in an extended state of being arranged to be extended over the bed and in a retracted state of being retracted to a rear side of a roof of the cab,
wherein a top surface of the cover members in the retracted state is disposed at the same elevation in a vehicle height direction as a top surface of a rear-end section of the roof which is positioned on the rear roof side of the cab or is disposed lower than the top surface of the rear-end section of the roof and, along with the top surface of the roof of the cab, causes a continuous flow path of an air current to be formed,
wherein the support unit causes the respective cover members to slide along a guide path extending to a front side from a rear side of the bed, toward retracted positions set on the rear side of the roof of the cab, and thereby is able to switch between the extended state and the retracted state,
wherein the vehicle cover apparatus further comprises
a first cover member that is disposed at a first retracted position, and
a second cover member that is disposed at a second retracted position and thereby a top side thereof is covered by the first cover member,
wherein the first cover member is arranged to be extended closer to side of the rear-end section of the bed than the second cover member,
wherein the support unit includes
a first guide path that extends toward the first retracted position,
a second guide path that diverges from the first guide path, and
a separation mechanism that separates the second cover member sliding along the first guide path therefrom to the second guide path and causes the second cover member to be disposed at the second retracted position,
wherein the guide path includes first and second side walls,
wherein the first cover member engages with the first side wall, and
wherein the second cover member engages with the second side wall and the second side wall is provided with a movable wall that slides to a vehicle front side when the movable wall is pressed by the second cover member.

2. The vehicle cover apparatus according to claim 1, further comprising:
a fixed member that is fixed to the rear-end section of the roof,
wherein a top surface of the fixed member is disposed at the same elevation in a vehicle height direction as the top surface of the rear-end section of the roof or is disposed lower than the top surface of the rear-end section of the roof and, along with the top surface of the roof, causes a continuous flow path of an air current to be formed,
in the retracted state, at least one cover member of the plurality of cover members comes close to or into contact with the fixed member, and
a top surface of the cover member which comes close to or into contact with the fixed member is disposed lower than the top surface of the fixed member and a continuous flow path of an air current is formed by the top surface of the roof and the top surface of the fixed member.

3. The vehicle cover apparatus according to claim 1,
wherein, in the retracted state, at least one cover member of the plurality of cover members comes close to or into contact with the rear-end section of the roof.

4. The vehicle cover apparatus according to claim 2,
wherein the respective cover members in the extended state are disposed at predetermined intervals in a vehicle front-rear direction and the respective cover members in the extended state are disposed lower than a cover member which is disposed in front of the respective cover members.

5. The vehicle cover apparatus according to claim 3,
wherein the respective cover members in the extended state are disposed at predetermined intervals in a vehicle front-rear direction and the respective cover members in the extended state are disposed lower than a cover member which is disposed in front of the respective cover members.

6. The vehicle cover apparatus according to claim 4,
wherein the respective cover members are arranged to be extended in uneven states so as to be disposed along a line connecting the rear-end section of the roof of the cab and a rear-end section of the bed.

7. The vehicle cover apparatus according to claim 5,
wherein the respective cover members are arranged to be extended in uneven states so as to be disposed along a line connecting the rear-end section of the roof of the cab and a rear-end section of the bed.

* * * * *